United States Patent [19]

Rantanen et al.

[11] 4,343,708

[45] Aug. 10, 1982

[54] METHOD AND EQUIPMENT FOR THICKENING OF SUSPENSION OR PULP

[75] Inventors: Mikko Rantanen, Noormarkku; Alpo Tuomi; Reino Laiho, both of Pori, all of Finland

[73] Assignee: Rauma-Repola Oy, Finland

[21] Appl. No.: 260,743

[22] Filed: May 5, 1981

[30] Foreign Application Priority Data

May 28, 1980 [FI] Finland .................................. 801735

[51] Int. Cl.³ ............................................. B01D 33/06
[52] U.S. Cl. .................................... 210/744; 210/784; 210/806; 210/97; 210/297; 210/402
[58] Field of Search .................. 210/784, 744, 97, 116, 210/123, 402, 403, 404, 102, 297, 806

[56] References Cited

U.S. PATENT DOCUMENTS

| | | | |
|---|---|---|---|
| 2,972,408 | 2/1961 | Krijgsman | 209/38 |
| 3,064,813 | 11/1962 | Smith | 210/402 |
| 3,381,821 | 5/1968 | Hellstrom | 210/404 |
| 3,960,726 | 6/1976 | Peterson | 210/744 |
| 4,115,271 | 9/1978 | Holt | 210/402 |
| 4,146,476 | 3/1979 | Spiewok | 210/744 |

FOREIGN PATENT DOCUMENTS

| | | | |
|---|---|---|---|
| 745052 | 1/1970 | Belgium | 210/784 |
| 49330 | 11/1973 | Finland | 210/402 |
| 1278629 | 6/1972 | United Kingdom | 210/402 |

*Primary Examiner*—Ernest G. Therkorn
*Attorney, Agent, or Firm*—Burns, Doane, Swecker & Mathis

[57] ABSTRACT

A method and equipment for thickening various suspensions, such as, e.g., pulp slurry, waste waters, or mineral sediments. The sludge or slurry is passed into a basin in which a filter unit rotates as partly submerged in the sludge or slurry. The thickened sludge or pulp web is gathered onto the surface of the filter unit from the sludge or the slurry in the basin. The sludge or slurry is passed from the basin to above the sludge or slurry level. In order to pre-thicken the sludge or slurry, part of the liquid contained therein is removed through a wall located between the feeding-in point of the sludge or slurry and the surface level of the sludge or slurry.

7 Claims, 2 Drawing Figures

METHOD AND EQUIPMENT FOR THICKENING OF SUSPENSION OR PULP

BACKGROUND AND SUMMARY OF THE PRESENT INVENTION

The present invention is concerned with a method for thickening various suspensions, such as, e.g., pulp slurry, waste waters, or mineral sediments, so that the sludge or slurry is passed into a basin in which a filter unit rotates partly submerged in the sludge or slurry, the thickened sludge or pulp web being gathered onto the surface of said filter from the sludge or the slurry in the basin, at which time the sludge or slurry is passed from the basin to above the sludge or slurry level. The invention is also concerned with equipment for the implementation of the method, said equipment comprising a basin for the sludge or slurry, a rotary filter unit partly submerged in the sludge or slurry, a device for passing the sludge or slurry into the basin above the level of the sludge or slurry, and a device for removing the sludge or pulp web from the filter unit.

It is well known that when, e.g., a cellulose fibre sludge or slurry is fed by of a rotary drum filter, the capacity of the filter depends on the feeding thickness of the pulp fed onto the filter. When the thickness is increased, e.g., from the value 0.5% to 1.5%, the capacity of the filter is almost doubled. For pre-thickening the pulp, a known procedure is the use of a rotary drum prethickener, which is arranged in front of the filter proper. Such a separate prethickener, however, requires a drive mechanism of its own and equipment for passing jet water into same. The space requirement of the prethickener is quite large, and it also requires a considerable additional investment.

The object of the present invention is to increase the thickness of the sludge or slurry to be fed to the filter in order to increase the capacity of the filter without a separate prethickener. The method in accordance with the invention is mainly characterized in that, in order to pre-thicken the sludge or slurry, part of the liquid contained therein is removed through a wall located beween the feeding-in point of the sludge or slurry and the surface level of the sludge or slurry. The equipment in accordance with the invention is characterized in that the wall located between the feeding-in point of the sludge or slurry and the level of the sludge or slurry wholly or partly consists of a portion of the wall provided with openings or channels.

When the equipment in accordance with the invention is used, neiter extra space nor the separate drive mechanism required by a separate drum filter is needed. In the equipment in accordance with the invention it is easy to control the feeding thickness of the sludge or slurry fed to the filter proper. It is also very easy to cleanse the equipment.

BRIEF DESCRIPTION OF THE DRAWINGS

The invention will be described in more detail below with reference to the attached drawings, wherein.

DETAILED DESCRIPTION OF THE PREFERRED EMBODIMENT

Figure 1:
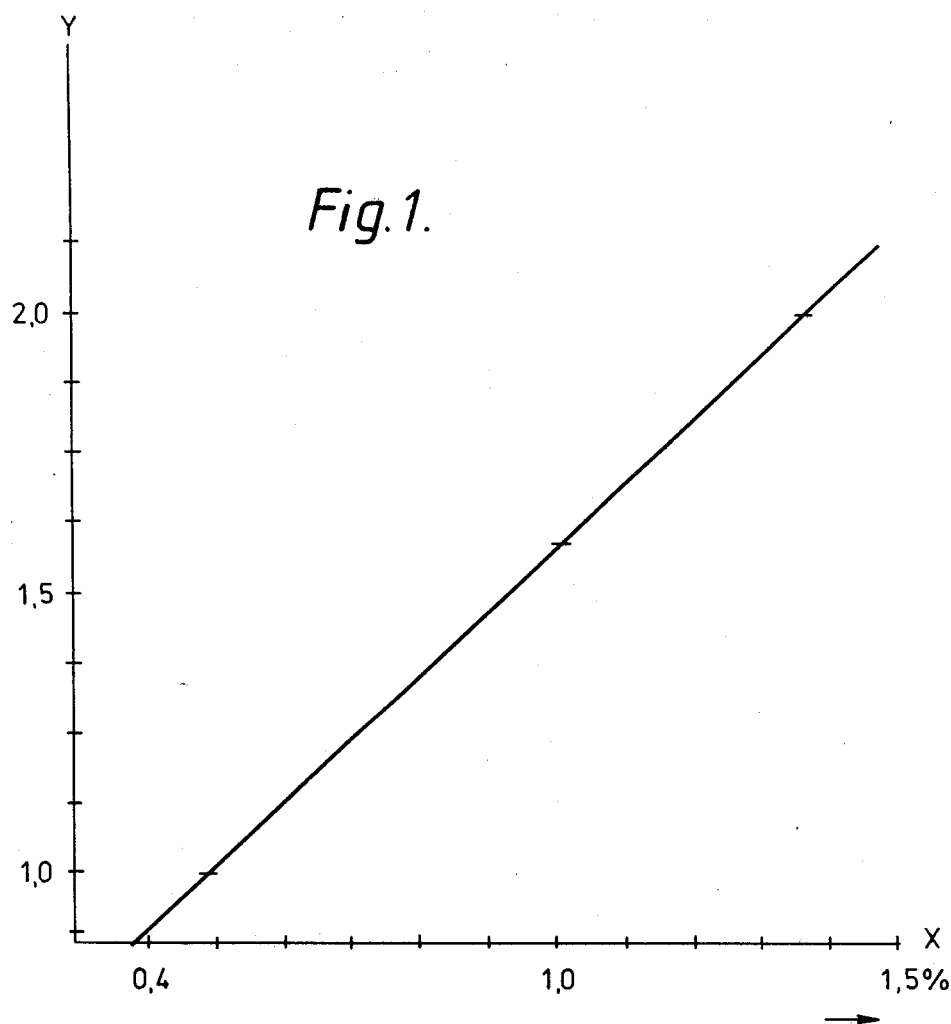
FIG. 1 is a graphic presentation of the effect of the feeding thickness of the slurry upon the capacity of the filter.

In FIG. 1, the x-axis illustrates the feeding thickness as percentage and the y-axis illustrates the capacity ratio. By capacity ratio is meant the ratio of capacity with a certain feeding thickness to capacity with the thickness of 0.5%. From the figure it can be seen that the capacity of the filter can be increased up to the double by increasing the feeding thickness from, e.g., 0.5% to 1.5%.

Figure 2:
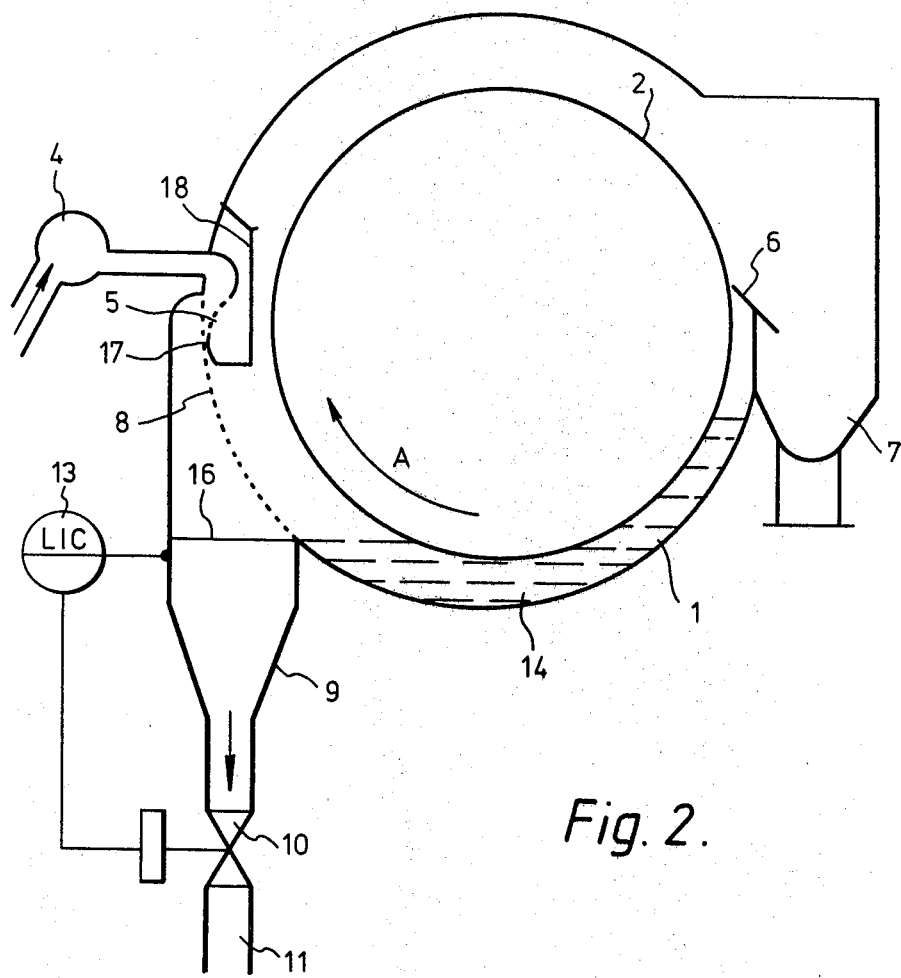
FIG. 2 is a cross-sectional view of a device in accordance with the invention.

FIG. 2 illustrates a drum filter in which the method in accordance with the invention is used. The filter is provided with a basin 1, wherein the drum 2 rotates in the direction shown by the arrow A. The filter is provided with a slurry feeding device 4, which includes a lip portion 5. Such a feeding equipment provided with a lip portion is described in the Finnish Pat. No. 49,330. The filter further comprises means 6 for detaching the pulp web from the drum as well as a pulper 7. The lip proper of the lip portion 5 consists of an inclined screen sheet 17 and of a casing portion 18 connected to same. From the casing portion, an exhaust pipe (not shown in the drawing) is provided for passing liquid off the casing. On the inlet side of the basin of the filter washer, the inclined wall of the basin consists of a screen sheet 8, underneath which there is the basin 9. The screen sheets 17 and 8 function as prethickeners. In the bottom part of the basin 9, there is an exhaust pipe 11 provided with a valve 10 for passing the filtrate away from the prethickener basin 9 into a filtrate tank (not shown in the drawing). The surface level in the prethickener basin 9 is controlled by a level control device 13, which controls the valve 10 in the exhaust pipe 11.

The equipment in accordance with the invention operates so that slurry is passed via the feeding device 4 and the lip portion 5 onto the basin wall 8. Thereby water is separated from the slurry through the holes in the walls 17 and 8, and the partly thickened slurry 14 passes further into the basin 1 to underneath the filter drum proper. The water separated in the prethickener part is passed through the pipe 11, e.g., back to the dilution of the pump to be fed. If the surface level 16 in the basin 9 is raised to above the bottom edge of the screen sheet 8, the effective part of the screen sheet 8 becomes smaller. In this way the thickness of the pump passing to the drum filter proper can be easily adjusted by changing the quantity of the liquid passing through the prethickener. If the capacity of the prethickener is not sufficient, it is easy, if necessary, also to provide suction on the side of the basin 9, which suction pulls liquid through the screen sheet 8 into the basin 9.

Correspondingly, the water separated into the casing part 18 is conducted away. If desired, the casing part may also be provided with suction.

Having passed by the screen sheet 8, the pre-thickened slurry 14 flows into the basin 1 and its filtration takes place in the normal way. The pressure inside the drum 2 is lower than the pressure outside the drum, whereby, when the drum rotates, a pulp web is collected onto its surface out of the slurry. The pulp web is removed by a scraper 6, from which it is further passed via the pulper 7 to the next step of the process.

The prethickener can be cleansed easily by passing either liquid or air under pressure through the screen sheet 8 from the basin 9 to the side of the filter proper, unless the self-cleansing effect of the slurry flow is sufficient. In the same way it is possible to perform cleansing of the screen sheet 17 by passing liquid or air from the casing 18 through the screen sheet 17.

The invention is not restricted to the embodiment described above only, but it may show even considerable variation within the scope of the patent claims. The bottom edge of the screen sheet 8 may extend, e.g., to about 30° to 45° above the lowest point of the drum 2 in the direction of rotation of the drum 2. As screen sheets 17 and 8, it is possible to use a perforated sheet, a slot screen, hole screen, wire screen, bar screen, wire mesh, or a combination of any of the above. The prethickener may be applied to any filter provided with a filter means rotating in a basin, e.g., to a disk, pressure or suction filter or to a filter based on the force of gravity. A filter in accordance with the invention can be used for thickening any mechanical or chemical pulp slurry, such as mechanically ground pulp, pressure-ground pulp, honed pulp, thermo-honed pulp, chemical thermo-honed pulp, or chemical pulp, as well as for thickening various fibres and particles present in dilute liquids, such as mineral sediments and waste waters as well as waters coming from drying machines and containing fibres and clay or talc. The equipment can be constructed so that it has a screen sheet for the pre-thickening both in the lip portion 5 and in the basin wall 8, or only in either one of those parts.

The principles, preferred embodiments and mode of operation of the present invention have been described in the foregoing specification. However, the invention which is intended to be protected is not to be contrued as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in claims be embraced thereby.

What is claimed is:

1. A method for thickening various suspensions or slurries, comprising the steps of passing a sludge or slurry into a basin, rotating a filter unit partly submerged in the sludge or slurry, gathering the thickened sludge or slurry onto the surface of said filter unit from the sludge or the slurry in the basin, passing the sludge or slurry from the basin to above a surface level of the sludge or slurry level, prethickening the sludge or slurry prior to passing the sludge or slurry into a lower portion of the basin by removing a portion of the liquid contained therein through screening means located in an inclined wall of the basin, said inclined wall being located between a feeding-in point of the sludge or slurry and the surface level of the sludge or slurry, and collecting the liquid passing through the screening means in a receiver located below the screening means.

2. A method as claimed in claim 1, further comprising the step of controlling the thickness of the sludge or slurry coming to the filter unit by changing the level of the liquid surface level on the screening means through which the liquid is removed.

3. An apparatus for thickening various suspensions or slurries, comprising a basin for the suspension or slurry, a rotary filter unit partly submered in the slurry, feeding means for passing the suspension or slurry into the basin arranged above the suspension or slurry level, means for removing the thickened suspension or slurry from the filter unit, means for prethickening the suspension or slurry prior to passing the suspension or slurry into a lower portion of the basin, said means comprising screening means located in an inclined wall of the basin, said inclined wall being located between a feeding-in point for the feeding means for the suspension or slurry into the basin and the surface level of the suspension or slurry, and means located below the screening means for collecting the liquid passing through the screening means.

4. The apparatus as claimed in claim 3, wherein the screening means is located within the range of 30° to 180° beyond the lowest point of the basin in the direction of rotation of the filter unit.

5. The apparatus as claimed in claim 4, further comprising means for controlling the surface level of the suspension or slurry at the screening means.

6. The apparatus as claimed in claim 3, further comprising second screening means located in a lip portion of the feeding means which is provided with a casing for gathering liquid passing through the wall portion of the lip portion.

7. The apparatus as claimed in claim 3, wherein the screening means is located within the range of 45° to 135° beyond the lowest point of the basin in the direction of rotation of the filter unit.

* * * * *